(12) United States Patent
Biswas et al.

(10) Patent No.: US 7,849,387 B2
(45) Date of Patent: Dec. 7, 2010

(54) DETECTING ARCHITECTURAL VULNERABILITY OF PROCESSOR RESOURCES

(75) Inventors: Arijit Biswas, Holden, MA (US); Niranjan Soundararajan, State College, PA (US); Shubhendu Mukherjee, Southborough, MA (US)

(73) Assignee: Intel Corporation, Santa Clara, CA (US)

( * ) Notice: Subject to any disclaimer, the term of this patent is extended or adjusted under 35 U.S.C. 154(b) by 339 days.

(21) Appl. No.: 12/148,812

(22) Filed: Apr. 23, 2008

(65) Prior Publication Data
US 2009/0271676 A1 Oct. 29, 2009

(51) Int. Cl.
*H03M 13/00* (2006.01)
(52) U.S. Cl. .................. 714/799; 714/733; 714/722; 714/800; 714/48; 714/764; 714/754; 714/38; 714/11; 714/17; 714/31; 714/2; 714/746; 712/244; 717/141

(58) Field of Classification Search ................. None
See application file for complete search history.

(56) References Cited

U.S. PATENT DOCUMENTS

| | | | | |
|---|---|---|---|---|
| 7,386,756 | B2* | 6/2008 | Emer et al. ................ | 714/6 |
| 7,543,221 | B2* | 6/2009 | Mukherjee et al. .......... | 714/800 |
| 7,555,703 | B2* | 6/2009 | Mukherjee et al. .......... | 714/800 |
| 2001/0037447 | A1* | 11/2001 | Mukherjee et al. .......... | 712/239 |
| 2002/0199175 | A1* | 12/2002 | Saulsbury .................. | 717/141 |
| 2007/0011513 | A1* | 1/2007 | Biswas et al. ............... | 714/722 |

FOREIGN PATENT DOCUMENTS

EP       1 612 676 A2    4/2006

OTHER PUBLICATIONS

Kristen R. Walcot, et al., "Dynamic Prediction of Architectural Vulnerability from Microarchitectural State", ISCA '07, Jun. 2007, pp. 516-527.*
Arijit Biswas, et al., "Computing Architectural Vulnerability Factors for Address-Based Structures," Jun. 2005, pp. 1-12.*
Shubhendu S. Mukherjee, et al., "The Soft Error Problem: An Architectural Perspective," Feb. 2005. pp. 243-247.*
PCT/US2009/041074 International Search Report with Written Opinion of the International Searching Authority mailed on Nov. 30, 2009.
Arijit Biswas, et al., "Computing Architectural Vulnerability Factors for Address-Based Structures," Jun. 2005, pp. 1-12.
Kristen R. Walcott, et al., "Dynamic Prediction of Architectural Vulnerability from Microarchitectural State," Jun. 2007, pp. 516-527.
Eugene Normand, "Single Event Upset at Ground Level," Boeing Defense & Space Group. Seattle, WA, pp. 1-11.
Hisashige Ando, et al., "A 1.3GHz Fifth Generation SPARC64 Microprocessor," Jun. 2-6, 2003, pp. 1-4.

* cited by examiner

*Primary Examiner*—John P Trimmings
(74) *Attorney, Agent, or Firm*—Trop, Pruner & Hu, P.C.

(57) ABSTRACT

In one embodiment, a quantum detector is provided to detect a vulnerability measure for a processor based on a processor metrics each associated with operation of a processor structure during a quantum, along with a controller to control an error mitigation unit based on the vulnerability measure. Other embodiments are described and claimed.

22 Claims, 7 Drawing Sheets

DETECTING ARCHITECTURAL VULNERABILITY OF PROCESSOR RESOURCES

BACKGROUND

Radiation-induced soft errors, caused primarily by neutron particles, have become a major problem for processor designers. Because this type of error does not reflect a permanent failure of the device, it is termed a soft or transient error. These bit upsets from transient faults are in addition to those caused by alpha particles from packaging material and bumps. It is expected that the exponential increase in the number of transistors on a single chip and aggressive voltage scaling will make this problem significantly worse in future generations of chips.

To address cosmic ray strikes, some approaches seek to protect a large percentage of total latches in a processor or other semiconductor device with some form of error detection, such as parity. Similarly, most major arrays such as caches and register files in high-performance microprocessors have some form of error detection and recovery. As more transistors are added to a single chip it becomes even more challenging to maintain the same level of reliability in succeeding generations of processors.

Reliability is measured in failures in time (FIT), where one FIT represents one failure in one billion hours of operation. There are three main components of FIT: the intrinsic error rate of the circuit, which is a function of the manufacturing process and clocking schemes; the number of bits in the microprocessor, which is a design parameter; and the architectural vulnerability factor (AVF), which is the probability that a bit flip results in a user-visible error. A user-visible error is defined as any bit corruption which reaches the pins of the microprocessor and escapes to main memory or an input/output (I/O) device. Of these three components of FIT, the AVF is the only one that can vary significantly over time. Indeed, studies have shown that AVF can vary greatly (by over 90% in cases), from one program to another on average. AVF can vary significantly within a program as well, when measured in real-time over small periods of time known as quanta, instead of averaged over long runs.

Most architectural and microarchitectural error detection/recovery mechanisms attempt to reduce the average AVF of the microprocessor, thereby improving the overall reliability. This improved reliability however, comes at a cost in power and performance. Schemes such as parity prediction and residue which are primarily used to protect execution units can have a high power cost. Microarchitectural redundancy schemes such as redundant execution can have both a power cost and a performance cost since execution units which could be used to compute two different instructions in parallel are used to compute a single instruction redundantly. Most error mitigation schemes are always active, since there is no current reliable way to measure the real-time AVF during program execution. As a result, the power and performance costs for such mechanisms are a fixed penalty.

DETAILED DESCRIPTION

In various embodiments, a quantized AVF (Q-AVF) may provide a real-time indication of architectural vulnerability during processor execution. Such a Q-AVF may vary significantly from an average AVF. Because Q-AVF is a real-time indication of the architectural vulnerability, embodiments may leverage this information to control error mitigation hardware accordingly. That is, embodiments may measure a quantized AVF metric and based on its measure, determine whether error mitigation hardware is to be used, and the extent of such use. For example, one or more thresholds can be set for acceptable vulnerability and mitigation hardware can be activated when the Q-AVF exceeds a given threshold. In this way, the error hardware can be dynamically controlled, saving power and improving performance when the vulnerability is low, and only incurring these penalties in exchange for increased reliability when the error vulnerability is actually high.

Some examples of such savings can be seen in error mitigation schemes such as redundant multi-threading (RMT), or dual-mode redundancy (DMR). In RMT, two copies of a single thread are executed redundantly, and their results are checked prior to commit. DMR involves executing the same instruction redundantly on two separate pieces of hardware, such as two symmetric execution ports, and comparing the results. In both cases, redundancy costs both power and performance, since the redundant resources could otherwise be used to execute different instructions in parallel, thereby improving performance and overall power. Using embodiments of the present invention, Q-AVF can be computed to identify periods of time when the soft error vulnerability is low and used to dynamically control the use of these error mitigation techniques, to thus save on performance, power and even area since the area that was used for redundant execution can be used to improve performance.

Other error mitigation schemes, such as parity prediction or residue, generate special code bits with every operation, which are then stored with the result. When the result is read, the codes are re-generated and compared against the stored codes in order to detect errors. Based on a determined Q-AVF, embodiments can control execution to only perform this code generation when the error vulnerability is high, thus saving the power cost of performing these operations during low vulnerability phases of the program. Parity and error correction coding (ECC) can likewise be dynamically enabled or disabled in order to save power using embodiments of the present invention.

In another example, multiple vulnerability thresholds can be provided, instead of a single binary on/off control. In this example, error mitigation can be increased or decreased based on the vulnerability. Assume two vulnerability thresholds. Anything below the first threshold is considered low vulnerability and does not require detection or correction. Anything between the first and second thresholds is considered medium vulnerability and may cause error detection to be performed but no correction. Anything above the second threshold is considered high vulnerability and may cause implementation of both error detection and correction. In this case, a Q-AVF metric can be used to determine what level of vulnerability the program is in. If the Q-AVF is medium (i.e., between the two thresholds), parity protection can be invoked on the vulnerable structure(s). If the Q-AVF rises to a high level (i.e., above the second threshold), then an error correction mechanism may instead be used. In this case, the power cost of the protection schemes is optimized by only incurring them when needed, and only as much as needed. In the case where the parity and/or ECC is not in-lined (and thus has a performance penalty), performance is also optimized.

Yet another example of dynamically controlling error mitigation hardware using Q-AVF information is with regard to checkpoints. Checkpoints are periodic snapshots of architectural state that are used to roll back to a known "good" operational point when an error is detected by some error detection mechanism. Checkpoints generally take up some amount of memory, which can become significant in large-scale multi-core or multi-socket systems, especially if multiple checkpoints are required. Embodiments can be used to determine the frequency at which checkpoints are generated and stored. When the vulnerability is low, memory and power can be saved by lowering the frequency of checkpoint generation. Conversely, if the vulnerability is high, then the checkpoint generation frequency can be increased. Ultimately, this optimizes both power and performance.

In various embodiments, different manners of approximating Q-AVF can be realized. Furthermore, such Q-AVF metrics can be determined for various structures within a processor or other semiconductor device. In some implementations, Q-AVF metrics may be analyzed at different scales. For example, in some implementations a full core basis may be used for Q-AVF measurements. Alternately or in addition, refined measures of Q-AVF can be determined and used to control error detection/correction mechanisms. For example, in other implementations different portions of a processor, such as a front end, a back end, a memory subsystem, or other such portions of a processor can have independent Q-AVF analyses performed thereon. Furthermore, different metrics of these various processor resources can be analyzed to estimate the Q-AVF. In one implementation, linear functions of certain processor metrics can be used to approximate the Q-AVF at different points in time for various structures.

In one embodiment, a hardware mechanism may be provided that can monitor specific metrics, derived from a linear regression analysis that can approximate the AVF and Q-AVF of a significant portion of a processor. Linear equations may be implemented in hardware, although the scope of the present invention is not limited in this regard. The hardware mechanism can include a set of hardware counters which, when the mechanism is activated, count a given parameter for a set period of time, referred to herein as a quantum. At the end of each quantum, the values in each of the counters can be processed via a linear function.

The specific linear function depends on the microarchitectural details of the processor and can be derived through linear regression analysis when correlating the actual AVF to a given list of metrics. In one embodiment linear functions used by the various logic discussed herein may be based on one or more linear regression analyses performed while designing a processor. Such analyses are based on the design parameters of the processor itself, and if those design parameters change the regression analysis can be updated to obtain a new function. In some implementations, as long as no fundamental change to the architectural behavior occurs within a processor family (e.g., only different sizes of design parameters such as cache size, buffer size, or so forth), weightings (i.e., coefficients) may change, but otherwise the function can remain the same across a number of processor designs. In various embodiments, the weights (i.e., coefficients) may be programmable from control registers, so that changing default values of the control registers can update the linear function(s).

Various factors may be considered when properly constructing a hardware mechanism. For example, counters have finite capacity; therefore they cannot count for extremely long periods of time without overflowing. If they overflow, they lose information. Thus, the quantum during which the mechanism operates can be set to be small enough such that the counters will not overflow, e.g., on the order of approximately a hundred to approximately a thousand processor cycles, although the scope of the present invention is not limited in this regard. Alternatively, a quantum size may be chosen such that the resulting Q-AVF provides a specific level of real-time accuracy. In this case, the counters for the linear equation metrics should be sized such that they are guaranteed not to overflow during the quantum.

Linear regression analysis can accurately approximate Q-AVF values for multiple different programs for tens of millions of cycles. Based on such analysis, a linear equation of simple processor metrics can be used to accurately estimate the real-time variation in vulnerability during the runtime of any given program. This variation in vulnerability thus indicates that error recovery mechanisms can be relaxed during the less vulnerable phases, thereby saving the power/performance cost of error mitigation during these phases. When the program enters a high vulnerability phase, the error mitigation mechanism would activate, increasing power consumption and reducing performance, but reducing the Q-AVF to zero or some acceptable low level when it is really needed.

A hardware mechanism thus generates a Q-AVF value for each quantum in which it is active. If this Q-AVF value is over a specified acceptable value, error mitigation hardware can be dynamically activated to reduce the AVF. If the Q-AVF value drops below a specific threshold, the error mitigation hardware can be dynamically deactivated. In this way, the error mitigation hardware is only used when it is actually needed, and otherwise does not incur the operation cost in power and performance.

Figure 1:
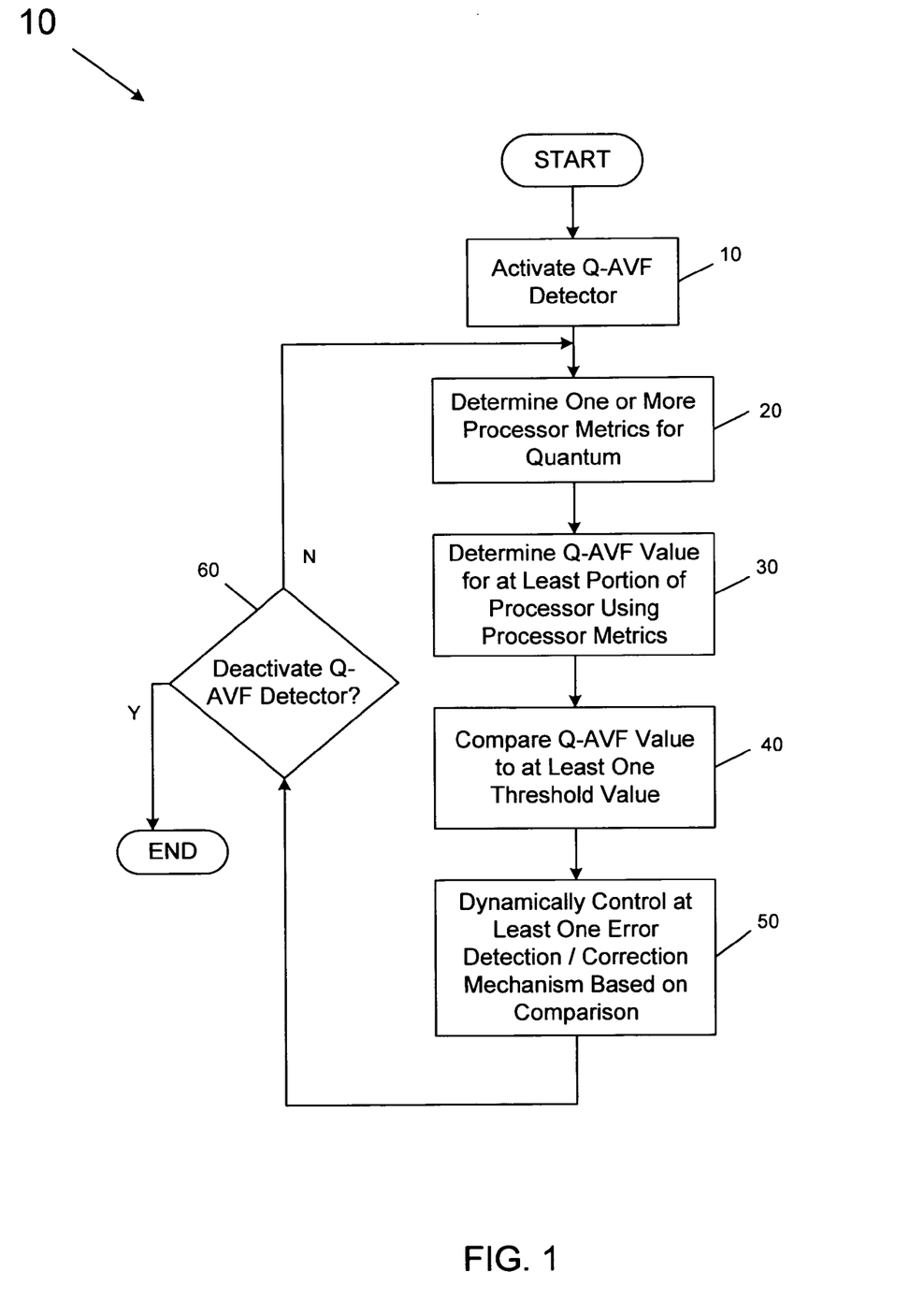
FIG. 1 is a flow diagram of a method in accordance with one embodiment of the present invention.

Referring now to FIG. 1, shown is a flow diagram of a method in accordance with one embodiment of the present invention. As shown in FIG. 1, method 10 may be used to operate a Q-AVF detector and to control one or more error correction/detection mechanisms dynamically based on information from the detector. As shown in FIG. 1, method 10 may begin by activating the Q-AVF detector. As mentioned above, the Q-AVF detector may be a mechanism including a set of hardware counters and logic such as control logic, computation logic, comparison logic and so forth, as will be discussed in particular implementations below. In some implementations, at least some of the counters used by a detector may leverage existing counters, e.g., of a performance monitoring unit of a processor.

Still referring to FIG. 1, after activation, which may be selectively controlled (e.g., under program control, user control, operating system control or so forth), one or more processor metrics may be determined for a given quantum (block 20). For example, the processor metrics may correspond to counts of different processor resources that are utilized during a given quantum. Particular resources and their utilization information will be discussed further below. After conclusion of a given quantum, the duration of which may vary in different embodiments, a Q-AVF value may be determined for at least a portion of the processor using the processor metrics (block 30). For example, as will be discussed further below, a combination of multiple processor metrics according to a predetermined function, such as a linear equation, may be used to determine the Q-AVF value. One or more such Q-AVF values may be determined, either for individual resources of a processor, a collection of such resources corresponding to a given unit of a processor, or on a full processor (e.g., core) basis.

Next, control passes to block 40, where the Q-AVF value may be compared to at least one threshold value. As discussed above, in some implementations a single threshold may be present, while in other implementations multiple thresholds may be present. Based on such comparison, at least one error detection/correction mechanism may be dynamically controlled (block 50). For example, if the Q-AVF value is below a threshold, such mechanisms can be disabled, while if the Q-AVF value is above the threshold, one or more such mechanisms can be enabled or further protection mechanisms can be activated. In one embodiment, a control signal may be generated by detector logic based at least in part on a comparison of a Q-AVF value to one or more thresholds. Such a control signal can be used to dynamically control error mitigation hardware, in one embodiment. In this way, a detector can dynamically control a penalty for implementing error mitigation. In other embodiments, the detector logic can provide a variable control, such that instead of just having two settings (i.e., on or off), multiple settings can be realized. For example, multiple redundancy or multiple protections may be present with each protection covering more of a processor, and also costing more in terms of power and performance. In such an embodiment, multiple control signals may be provided to choose between different levels of protection. Control then passes to diamond 60, where it may be determined whether the Q-AVF detector is to be deactivated. If so, method 10 concludes, otherwise control passes back to block 20, discussed above. While shown with this particular implementation in the embodiment of FIG. 1, the scope of the present invention is not limited in this regard. Note that in some embodiments, a detector can operate on-line or off-line. On-line means that detection and corresponding error mitigation control can be performed as the program is running, while off-line means that as the program is running counts of processor metrics can occur, and at a later time a Q-AVF can be determined, which may be useful to determine what a Q-AVF looks like for a given program, such that it can be modified, compiled, or controlled accordingly.

Figure 2:
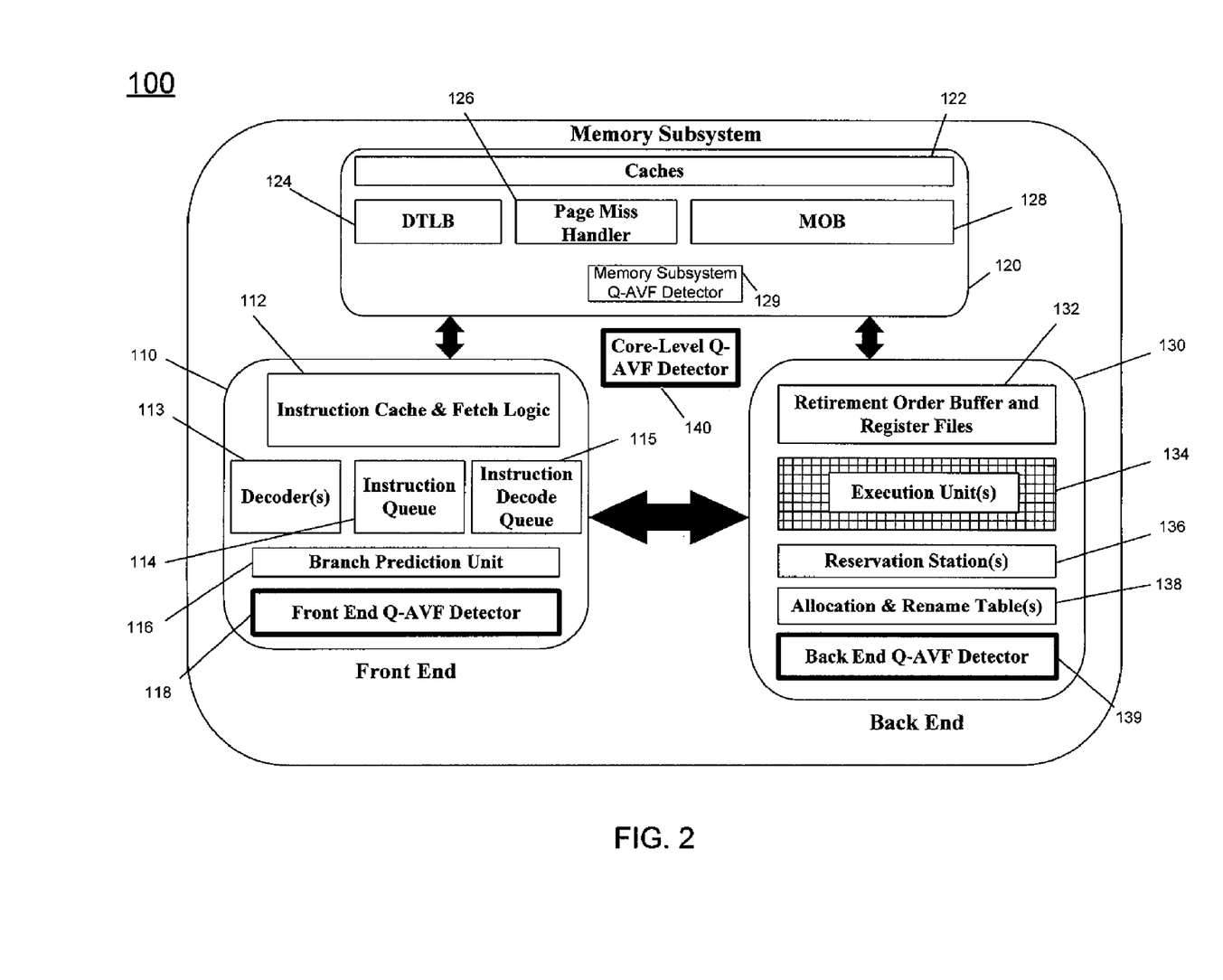
FIG. 2 is a block diagram of a processor in accordance with one embodiment of the present invention.

Embodiments may be used in connection with various processors or other semiconductor devices. However, for purposes of discussion the following example embodiment is with reference to a processor, such as a multi-core processor including multiple homogeneous or heterogeneous cores. Referring now to FIG. 2, shown is a block diagram of a processor in accordance with one embodiment of the present invention. As shown in FIG. 2, processor 100 shows a single core, however, understand that this single core may be replicated a number of times to form a complete multi-core processor. As shown in FIG. 2, processor 100 generally includes three portions, namely a front end (FE) 110, a memory subsystem (MS) 120, and a (BE) back end 130. FE 110 is primarily an in-order pipeline and includes instruction decode queues and instruction fetch units. BE 130 includes reservation stations, retirement buffers, execution units, register files and other architectural structures that regulate the flow of data execution. In out-of-order processors, BE 130 may be where instructions are scheduled and executed out-of-order. In certain architectures such as an Intel Architecture™ (IA32) processor, FE 110 and BE 130 can be further distinguished by the fact that FE 110 primarily deals with macro-operations, which are assembly instructions, while BE 130 deals with decoded micro-operations (μops), which are simpler instructions that have a many-to-one mapping with macro-ops. MS 120 includes memory order buffer (MOB) and various cache structures.

Thus as shown in FIG. 2, front end 110 may include an instruction cache and fetch logic 112 to obtain instruction information from lower cache levels (e.g., part of memory subsystem 120) and to temporarily store instructions that are expected to be used soon or multiple times. Coupled to instruction cache 112 is one or more decoders 113, which may decode instructions, an instruction queue 114 to store pending instructions, in connection with an instruction decode queue 115. Still further, a branch prediction unit (BPU) 116 may be present to predict a branch to be taken during program execution such that the instructions associated with the predicted branch may be obtained ahead of time. As further shown in FIG. 2, front end 110 may include a front end Q-AVF detector 118. As will be discussed further below, detector 118 may perform Q-AVF determinations for the various front end components shown in FIG. 2 (and possibly other such components).

As shown, front end 110 communicates with memory subsystem 120. Subsystem 120 includes caches 122, which may be level 1 (L1) and level 2 (L2) caches, where the L1 cache may be a data cache and the L2 cache a unified cache including both data and instructions. To aid with address translations, subsystem 120 further includes a data translation lookaside buffer (DTLB) 124, and a page miss handler (PMH) 126 to aid in accessing requested information from other levels of a memory hierarchy when a miss occurs to DTLB 124. Still further, memory subsystem may include a memory order buffer (MOB) 128, which may include store and load buffers to store entries associated with pending data transfer instructions, e.g., store and load instructions. Still further, subsystem 120 includes a memory subsystem Q-AVF detector 129. As will be discussed further below, detector 129 may perform Q-AVF determinations for the various memory subsystem components shown in FIG. 2 (and possibly other such components).

Further coupled to both front end 110 and memory subsystem 120 is back end 130, which may be used to process instructions out of order and reorder such instructions for retirement. Thus as shown in FIG. 2, back end 130 includes a retirement order buffer and register files 132, one or more execution units 134, which may include integer units, floating point units, vector units and so forth. Still further, back end 130 may include reservation stations 136, which may be used to provide instructions and operands to execution units 134. In turn, entries are provided to reservation stations 136 by allocation and rename tables 138, which may receive incoming instructions from front end 110 and allocate them to the various resources, including execution units 134 and register files 132, along with performing any renaming of the limited number of logical registers to the larger numbers of physical registers present in register files 132. Back end 130 further includes a back end Q-AVF 139. As will be discussed further below, detector 139 may perform Q-AVF determinations for the various back end components shown in FIG. 2 (and possibly other such components). As further shown in FIG. 2, a core-level Q-AVF detector 140 may further be present to handle core-based Q-AVF determinations.

While shown with this particular implementation in the embodiment of FIG. 2, the scope of the present invention is not limited in this regard. For example, in various implementations Q-AVF can be computed at different granularities. At one extreme is a per-structure basis (which would entail Q-AVF control hardware customized for each structure). At the other extreme, Q-AVF may be calculated on a per core basis, with other implementations falling in between. For example, aggregating structures that naturally associate into larger blocks such as FE, BE and MS can provide an efficient method for evaluating Q-AVF on distinct regions of a processor, while keeping the cost of implementing the hardware to a minimum.

While FIG. 2 shows that each portion of processor 100 can include its own detector, and that processor 100 may further include a core-level detector, understand that all of these detectors may not be present in a particular implementation. For example, in various implementations a smaller number or only a single one of such detectors may be present in a given processor. For ease of discussion, functionality of each detector shown in FIG. 2 will be discussed. However, note that in a given processor implementation only one, a subset or all of the described detectors may be present.

As discussed above, FE 110 includes the instruction queue which holds decoded macro-ops and the instruction decode queue which holds decoded micro-ops. In one embodiment, a minimum set of basic processor metrics can be used to compute a front end Q-AVF to within 95% accuracy on average, with a worst case accuracy better than 80%. In this embodiment, three parameters for FE Q-AVF determinations are: (1) instruction decode queue (IDQ) utilization (which may be determined based on the number of valid entries in the IDQ every cycle and the quantum size); retirement order buffer (ROB) utilization (which may be determined based on the number of valid entries in the ROB every cycle and the quantum size); and the number of branch mispredicts occurring during a quantum.

Utilization may be defined as the average number of valid entries in the given structure during a quantum. It is essentially a measure of the occupancy rate of the structure. Utilization metrics are generally given as some count divided by some amount of time. In this case, the count is the total number of valid entries summed every power cycle and the amount of time is fixed as the quantum size. In the interests of simplifying the hardware, the quantum size values can be chosen to be a power of two. In this way, a division operation is simplified to a simple bit shift of the count value by log2 of the quantum size, resulting in an integer value as the result of the division operation.

In one embodiment, this log2 operation can be done with a state machine that counts the number of zeros of the quantum value, from least to most significant bit, until the first logical one. The result is log2 of the quantum value and this operation may only be returned when quantum size changes. This value can then be stored in a register that is used for all utilization computations. A simple check to ensure that only the most significant bit of the specified quantum size value is written into the quantum size configuration register would force all quantum size values to be rounded down to the lowest power of 2.

Figure 3:
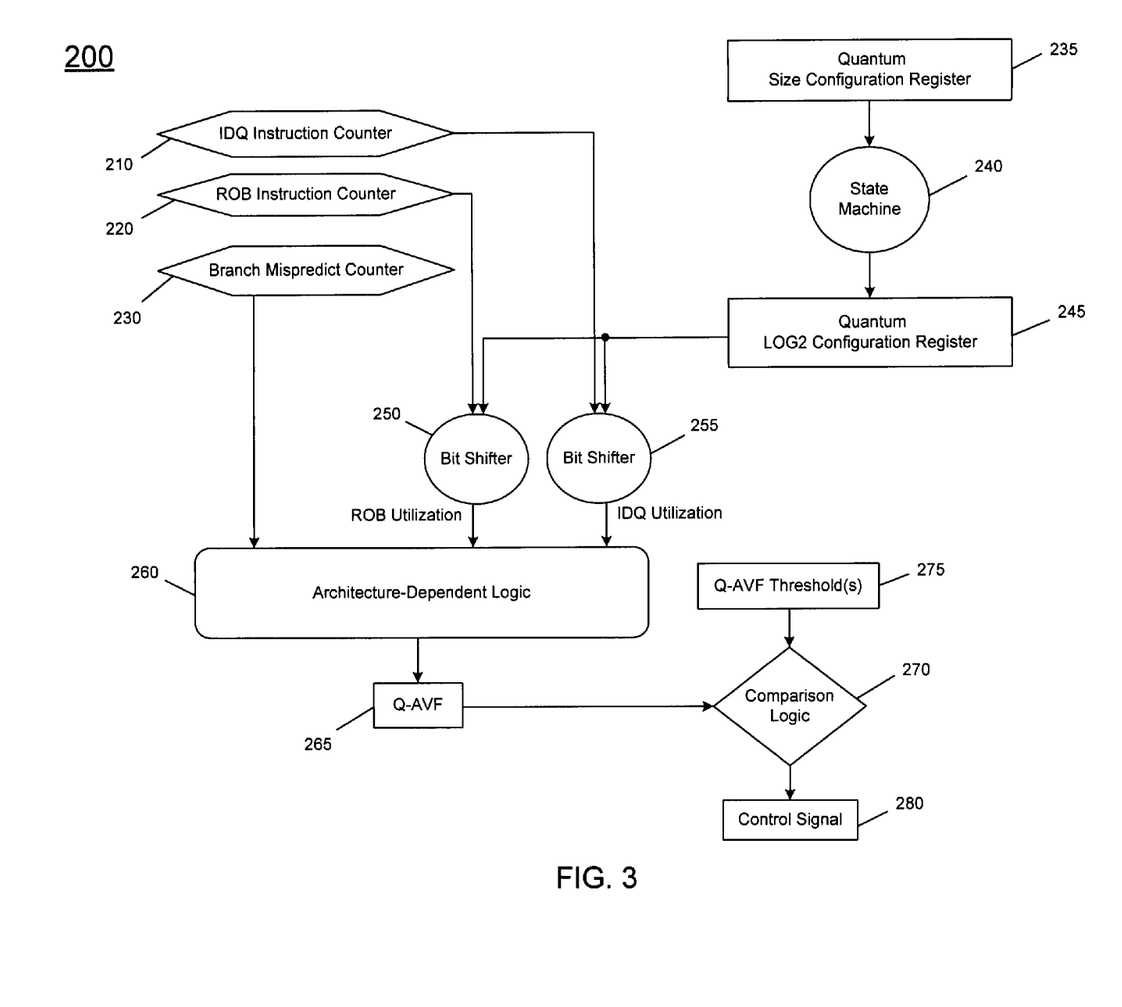
FIG. 3 is a block diagram of a front end Q-AVF detector in accordance with one embodiment of the present invention.

Referring now to FIG. 3, shown is a block diagram of a front end Q-AVF detector in accordance with one embodiment of the present invention. As shown in FIG. 3, detector 200 may include a plurality of counters, namely an IDQ instruction counter 210, a ROB instruction counter 220, and a branch mispredict counter 230. Each of these counters may be configured to count utilization of the given resource (or branch mispredictions) occurring during a given quantum. The length of the quantum may be stored in a quantum size configuration register 235, which may be set by a processor control register, e.g., under operating system (OS) control. Still further, a quantum log2 configuration register 245 may be present to provide a quantum log2 value, as discussed above. This quantum log2 value may be generated using a state machine 240, based on the value in quantum size configuration register 235.

As further shown in FIG. 3, an architecture-dependent logic 260, which may be adapted to perform an architecture-dependent linear equation based on processor metric information, is coupled to receive various inputs. Specifically, logic 260 receives the output of branch mispredict counter 230, along with the output of a pair of bit shifters 250 and 255, each of which is adapted to provide a measure of utilization, namely a ROB utilization and an IDQ utilization. Based on the information provided to it, logic 260 may generate a Q-AVF value which may be stored in a register 265. This Q-AVF value may be determined for each quantum.

Note that logic 260 may implement a linear equation that takes into account the various input data provided to it. In one embodiment, the linear equation may be as follows:

$$FE\ Q\text{-}AVF = -6.94888841 + 2.13964287(X) + 0.00000984(Y) - 0.00025137(Z) \quad [\text{EQ. 1}]$$

where
　X=IDQ Utilization,
　Y=ROB Utilization,
　Z=Number of Branch Mispredicts.

Note that the coefficients can be very small floating point numbers. However, this can be remedied by padding all values with enough zeros (or multiplying by a large power of 10) such that the numbers become integers. A similar operation can also be performed on the threshold value(s) before the comparison operation is done in a comparison logic 270. Note that this operation can be done off-line or only once every time the coefficients or threshold values are changed. This way, the operation need only be done once when new values are entered, a generally rare occurrence.

In various implementations, the coefficients will change depending on the architecture and design parameters of the processor, and a regression analysis can be used to determine coefficients for a given design. In some implementations, the constant term can also be ignored to simplify the hardware. If the constant is removed, it may be accounted for in the threshold value.

As shown in FIG. 3, the determined Q-AVF may be provided to comparison logic 270, where it may be compared with one or more Q-AVF thresholds which may be stored in a threshold register 275. Depending on whether the determined Q-AVF value exceeds one or more thresholds, a control signal 280 may be generated by comparison logic 270 and used to control one or more error detection/correction mechanisms as discussed above. While shown with this particular implementation in the embodiment of FIG. 3, the scope of the present invention is not limited in this regard, and other implementations are possible. Furthermore, note that detector 200 may be implemented in hardware, software, firmware or combinations thereof to enable the determination of a Q-AVF value and its use for controlling one or more error mechanisms.

Figure 4:
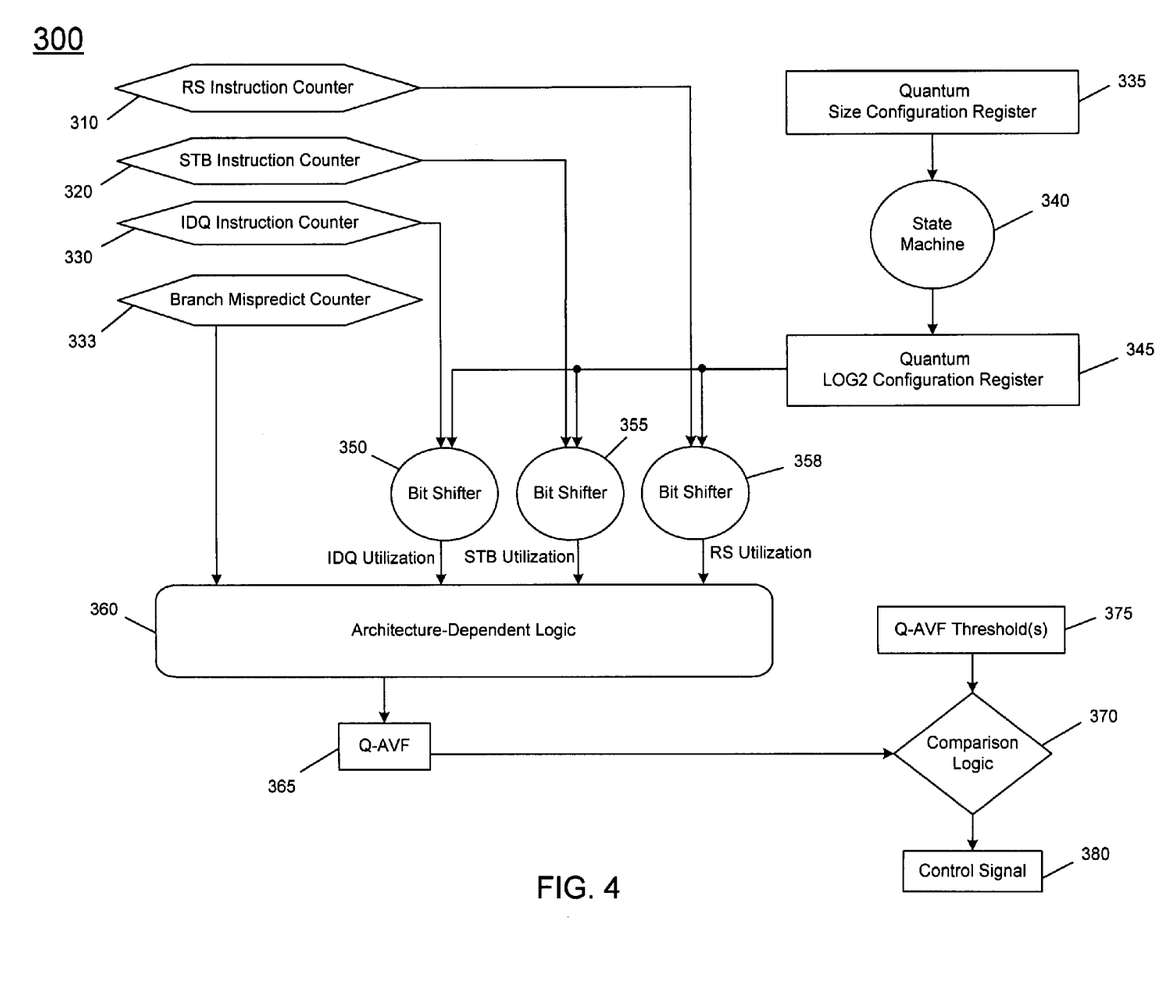
FIG. 4 is a block diagram of a back end Q-AVF detector in accordance with one embodiment of the present invention.

In addition to front end detector 200, some embodiments may further include a back end detector, or an implementation may include only a back end detector. As described above, back end 130 includes the reservation stations (RS), which hold micro-op instructions and data and schedules them into the execution units and the ROB, which holds micro-operations that are in-flight and reorders them before committing them to architectural state. In one embodiment, a minimum set of basic processor metrics can be used to compute the Q-AVF to within 95% accuracy on average, with a worst case accuracy better than 75%. For the back end Q-AVF, such parameters may include, in one embodiment: reservation station (RS) utilization (which may be determined based on the number of valid entries in the RS every cycle and the quantum size); store buffer (STB) utilization (which may be determined based on the number of valid entries in the ROB every cycle and the quantum size); the number of branch mispredicts; and the instruction decode queue (IDQ) utilization (which may be determined based on the number of valid entries in the IDQ every cycle and the quantum size).

Referring now to FIG. 4, shown is a block diagram of a back end Q-AVF detector in accordance with one embodiment of the present invention. As shown in FIG. 4, detector 300 may include a plurality of counters, namely a RS instruction counter 310, a STB instruction counter 320, an IDQ instruction counter 330, and a branch mispredict counter 333. Each of these counters may be configured to count utilization of the given resource (or branch mispredictions) occurring during a given quantum. The length of the quantum may be stored in a quantum size configuration register 335. Still further, a quantum log2 configuration register 345 may be present to provide a quantum log2 value, as discussed above. This quantum log2 value may be generated using a state machine 340, based on the value in quantum size configuration register 335.

As further shown in FIG. 4, an architecture-dependent logic 360, which may be adapted to perform an architecture-dependent linear equation based on processor metric information, is coupled to receive various inputs. Specifically, logic 360 receives the output of branch mispredict counter 333, along with the output of bit shifters 350, 355, and 358, each of which is adapted to provide a measure of utilization, namely a RS utilization, a STB utilization and an IDQ utilization. Based on the information provided to it, logic 360 may generate a Q-AVF value which may be stored in a register 365. This Q-AVF value may be determined for each quantum.

As shown in FIG. 4, the determined Q-AVF may be provided to a comparison logic 370, where it may be compared with one or more Q-AVF thresholds which may be stored in a threshold register 375. Depending on whether the determined Q-AVF value exceeds one or more thresholds, a control signal 380 may be generated by comparison logic 370 and used to control one or more error detection/correction mechanisms as discussed above. While shown with this particular implementation in the embodiment of FIG. 4, the scope of the present invention is not limited in this regard, and other implementations are possible. Furthermore, note that detector 300 may be implemented in hardware, software, firmware or combinations thereof to enable the determination of a Q-AVF value and its use for controlling one or more error mechanisms.

In one embodiment, logic 360 may perform an architecture-dependent linear equation in accordance with Equation 2:

$$BE\ Q\text{-}AVF = 5.31777325 + 0.17012719(W) - 0.10485529(X) - 0.00007263(Y) + 0.25594201(Z) \quad [\text{EQ. 2}]$$

where
W=RS Utilization
X=STB Utilization
Y=Number of Branch Mispredicts
Z=IDQ Utilization Note that as discussed above regarding logic 260 and Equation 1, the coefficients and/or constant term can be manipulated in advance to ease computation complexity. While shown with this particular equation with regard to the embodiment of FIG. 4, understand the scope of the present invention is not limited in this regard.

Figure 5:
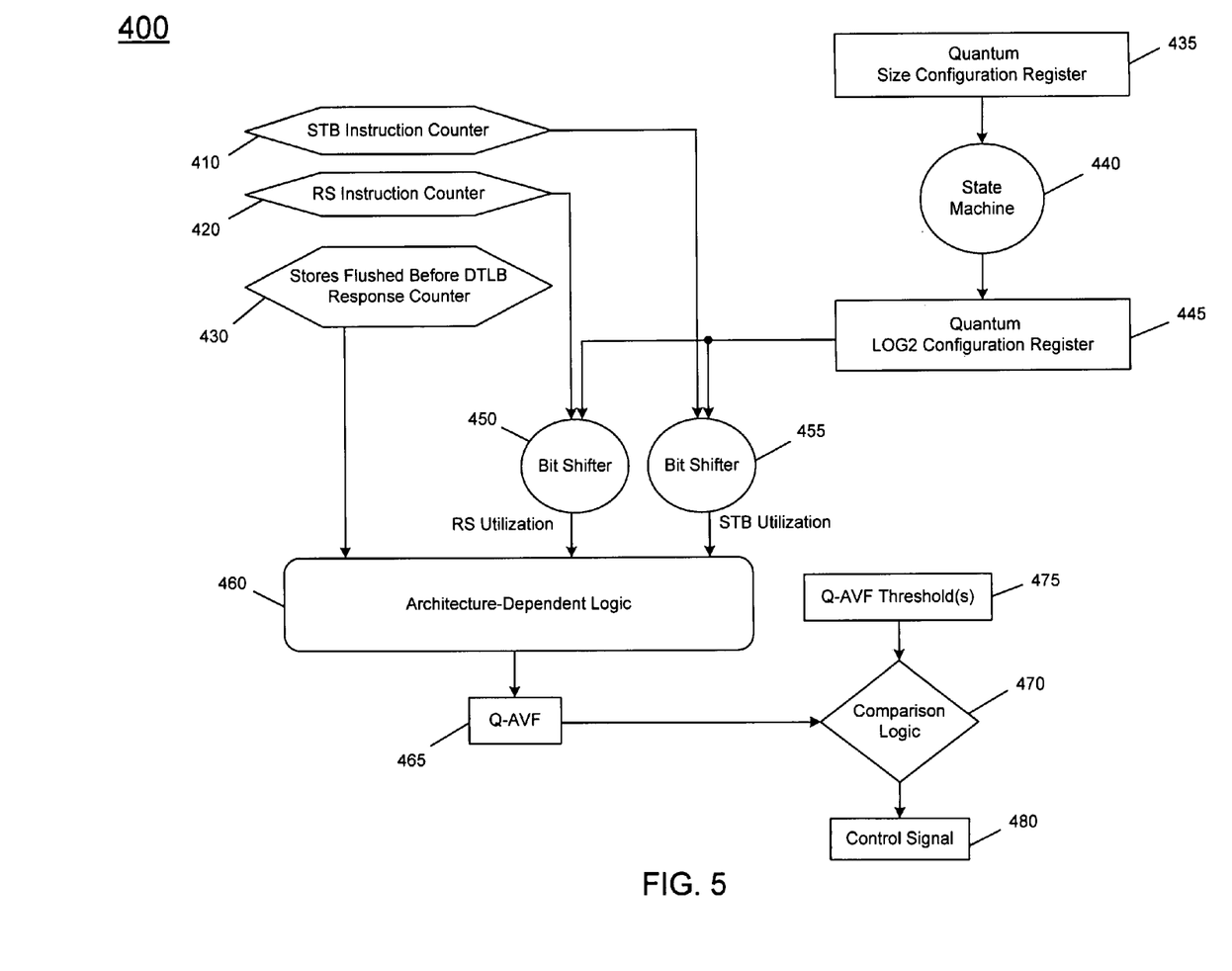
FIG. 5 is a block diagram of a memory subsystem Q-AVF detector in accordance with one embodiment of the present invention.

In yet other implementations, an AVF detector may be associated with memory subsystem 120. Such an AVF detector may be the sole detector present in a processor, or may be in addition to other detectors such as the front end and back end detectors described above. As set forth above, MOB 128 includes a store buffer which holds virtual and physical addresses and data for store operations and a load buffer which holds addresses for load operations. In one embodiment a minimum set of basic processor metrics can be used to compute the Q-AVF for the memory subsystem to within 95% accuracy on average, with a worst case accuracy better than 80%. In one embodiment, three parameters may be used to determine a Q-AVF for MOB 128: store buffer (STB) utilization (which may be determined based on the number of valid entries in the STB every cycle and the quantum size); reservation station (RS) utilization (which may be determined based on the number of valid entries in the RS every cycle and the quantum size); and a number of instructions flushed out of the store buffer before a DTLB response (i.e., counting of stores that were flushed after initiating DTLB access, but before the response returned).

Referring now to FIG. 5, shown is a block diagram of a memory system Q-AVF detector in accordance with one embodiment of the present invention. As shown in FIG. 5, detector 400 may include a plurality of counters, namely an STB instruction counter 410, a RS instruction counter 420, and a flushed store counter 430. Each of these counters may be configured to count utilization of the given resource (or flushed stores) occurring during a given quantum. The length of the quantum may be stored in a quantum size configuration register 435. A quantum log2 configuration register 445 may provide a quantum log2 value, which may be generated using a state machine 440, based on the value in quantum size configuration register 435.

As further shown in FIG. 5, an architecture-dependent logic 460, which may be adapted to perform an architecture-dependent linear equation based on processor metric information, is coupled to receive various inputs. Specifically, logic 460 receives the output of flushed store counter 430, along with the output of a pair of bit shifters 450 and 455, each of which is adapted to provide a measure of utilization, namely a STB utilization and an RS utilization. Based on the information provided to it, logic 460 may generate a Q-AVF value which may be stored in a register 465. This Q-AVF value may be determined for each quantum.

As shown in FIG. 5, the determined Q-AVF may be provided to a comparison logic 470, where it may be compared with one or more Q-AVF thresholds which may be stored in a threshold register 475. Depending on whether the determined Q-AVF value exceeds one or more thresholds, a control signal 480 may be generated by comparison logic 470 and used to control one or more error detection/correction mechanisms as discussed above. While shown with this particular implementation in the embodiment of FIG. 5, the scope of the present invention is not limited in this regard, and other implementations are possible. Furthermore, note that detector 400 may be implemented in hardware, software, firmware or combinations thereof to enable the determination of a Q-AVF value and its use for controlling one or more error mechanisms.

In one embodiment, logic 460 may determine a Q-AVF for the MOB in accordance with Equation 3:

$$MOB\ Q\text{-}AVF = 1.61820419 - 0.09218011(X) + 1.88263525(Y) - 0.0000307(Z) \quad [\text{EQ. 3}]$$

where

X=RS Utilization

Y=STB Utilization

Z=Number of STB Flushes before DTLB Response.

Figure 6:
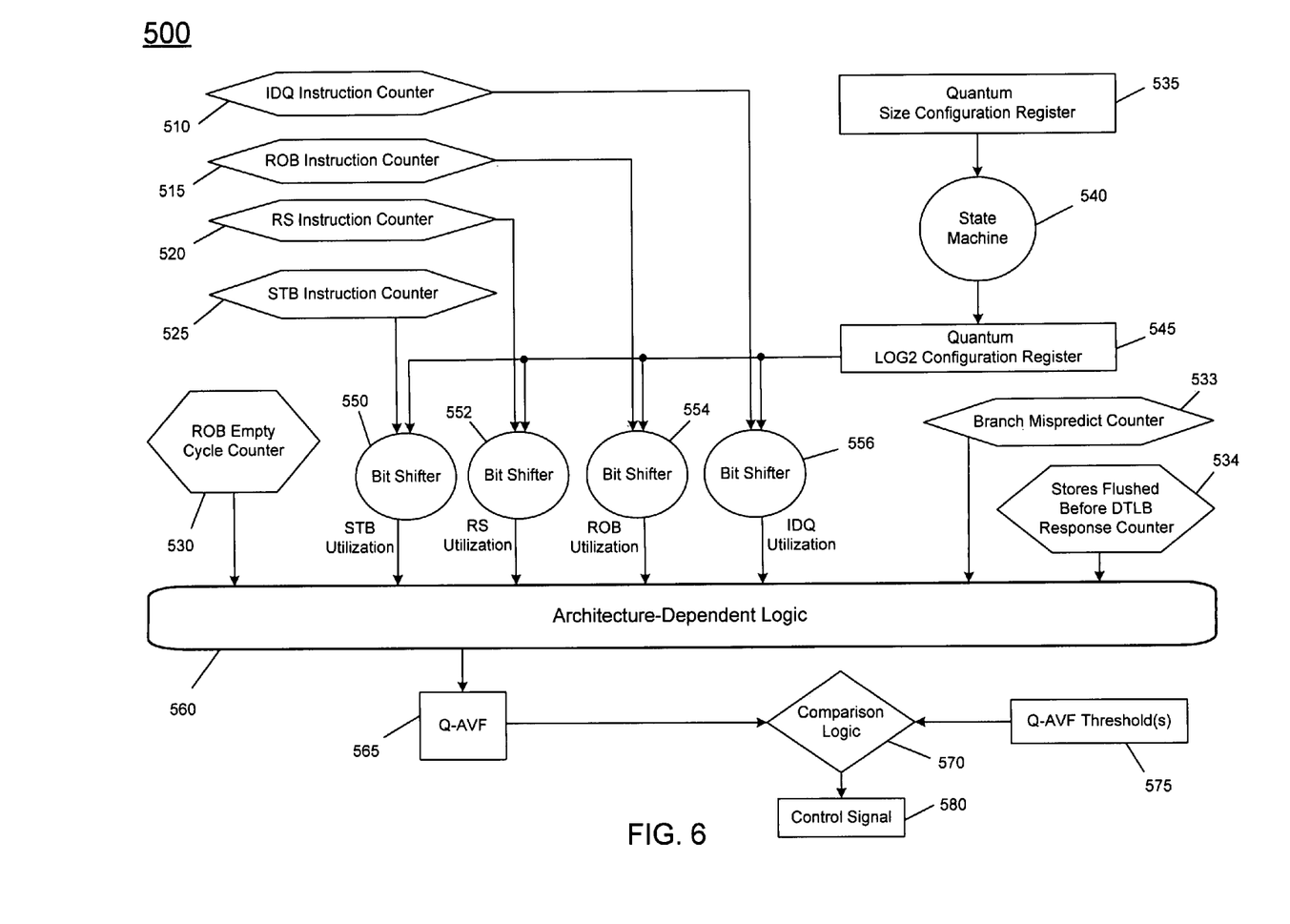
FIG. 6 is a block diagram of a core Q-AVF detector in accordance with one embodiment of the present invention.

In other embodiments, rather than individual detectors for different processor pipelines (e.g., the front end and back end detectors and the memory subsystem detector discussed above), in other embodiments, a single core or full-chip detector, such as detector 140 of FIG. 2 may be present. In some implementations, this may be the only such detector, as FE and BE pipelines generally track each other's Q-AVF trends. Furthermore, as seen above, there is significant overlap in the metrics that determine the Q-AVF of each block of the processor. Since certain error mitigation schemes impact the AVF of the entire chip, a Q-AVF detector may be provided for the entire microprocessor pipeline as a whole. A minimum set of basic processor metrics can be used to compute the Q-AVF of a processor to within 95% accuracy on average, with a worst case accuracy better than 80%. In one embodiment, seven parameters for the full chip Q-AVF determination are: instruction decode queue (IDQ) utilization; retirement order buffer (ROB) utilization; reservation station (RS) utilization; store buffer (STB) utilization; number of branch mispredicts; number of cycles the ROB is empty; and number of instructions flushed out of the store buffer before the DTLB response.

Referring now to FIG. 6, shown is a block diagram of a core Q-AVF detector in accordance with one embodiment of the present invention. As shown in FIG. 6, detector 500 may include a plurality of counters, namely an IDQ instruction counter 510, a ROB instruction counter 515, a RS instruction counter 520, a STB instruction counter 525, a ROB empty counter 530, a branch mispredict counter 533 and a flushed store counter 534. Each of these counters may be configured to count utilization of the given resource (or branch mispredictions or flushed stores) occurring during a given quantum. The length of the quantum may be stored in a quantum size configuration register 535. Still further, a quantum log2 configuration register 545 may be present to provide a quantum log2 value, as discussed above. This quantum log2 value may be generated using a state machine 540, based on the value in quantum size configuration register 535.

As further shown in FIG. 6, an architecture-dependent logic 560, which may be adapted to perform an architecture-dependent linear equation based on processor metric information, is coupled to receive various inputs. Specifically, logic 560 receives the output of counters, namely counters 510, 515, 520, 525, ROB empty counter 530, branch mispredict counter 533 and flushed store counter 534, along with the output of bit shifters 550, 552, 554, and 556. Based on the information provided to it, logic 560 may generate a Q-AVF value which may be stored in a register 565. This Q-AVF value may be determined for each quantum.

As shown in FIG. 6, the determined Q-AVF may be provided to a comparison logic 570, where it may be compared with one or more Q-AVF thresholds which may be stored in a threshold register 575. Depending on whether the determined Q-AVF value exceeds one or more thresholds, a control signal 580 may be generated by comparison logic 570 and used to control one or more error detection/correction mechanisms as discussed above. While shown with this particular implementation in the embodiment of FIG. 6, the scope of the present invention is not limited in this regard, and other implementations are possible. Furthermore, note that detector 500 may be implemented in hardware, software, firmware or combinations thereof to enable the determination of a Q-AVF value and its use for controlling one or more error mechanisms.

Using a full-chip detector, individual Q-AVF values for a front end, back end, and MOB may be determined in accordance with Equations 4-6, respectively.

$$FE\ Q\text{-}AVF = -10.5340689 + 1.91609831(A) + 0.00279797(B) + 0.29720333(C) + 0.11824924(D) - 0.00026378(E) + 0.00001177(F) + 0.00000496(G) \quad [\text{EQ. 4}]$$

$$BE\ Q\text{-}AVF = 3.1760199 + 0.15379405(A) + 0.06943891(B) + 0.50535518(C) - 0.15898313(D) - 0.00007247(E) + 0.00000233(F) - 0.00001199(G) \quad [\text{EQ. 5}]$$

$$MOB\ Q\text{-}AVF = 3.5974914 + 0.11588197(A) - 0.02028408(B) - 0.22281406(C) + 1.89341998(D) + 0.00003006(E) - 0.00000246(F) - 0.00006469(G) \quad [\text{EQ. 6}]$$

where

A=IDQ Utilization

B=ROB Utilization

C=RS Utilization

D=STB Utilization

E=Number of Branch Mispredicts

F=Number of ROB Empty Cycles

G=Number of STB Flushes before DTLB Response

Still further, using these same processor metrics, a full chip Q-AVF value may be determined as set forth in Equation 7.

$$\text{Full-Chip } Q\text{-}AVF = -1.2535192 + 0.728591443(A) + 0.0173176(B) + 0.19324815(C) + 0.61756203(D) - 0.00010206(E) + 0.00000388(F) - 0.00002391(G) \quad [\text{EQ. 7}]$$

Note that while described with these particular equations, logic 560 may determine a full chip Q-AVF (along with various unit's Q-AVFs) using other linear equations.

Thus in various embodiments dynamic control of error mitigation hardware based on Q-AVF estimation can greatly optimize reliability, power and performance, reducing more than 50% of the power and performance costs of implementing error mitigation hardware while not compromising reliability in any significant way. Embodiments thus leverage the fact that the AVF during any particular quantum can vary significantly from previous or future quanta. As a result, programs have high vulnerability phases and low vulnerability phases. Various processor metrics may be used to estimate the Q-AVF with significant accuracy, enabling control that can be used to directly or indirectly modify the behavior of error mitigation mechanisms in such a way as to optimize power, performance and reliability.

Figure 7:
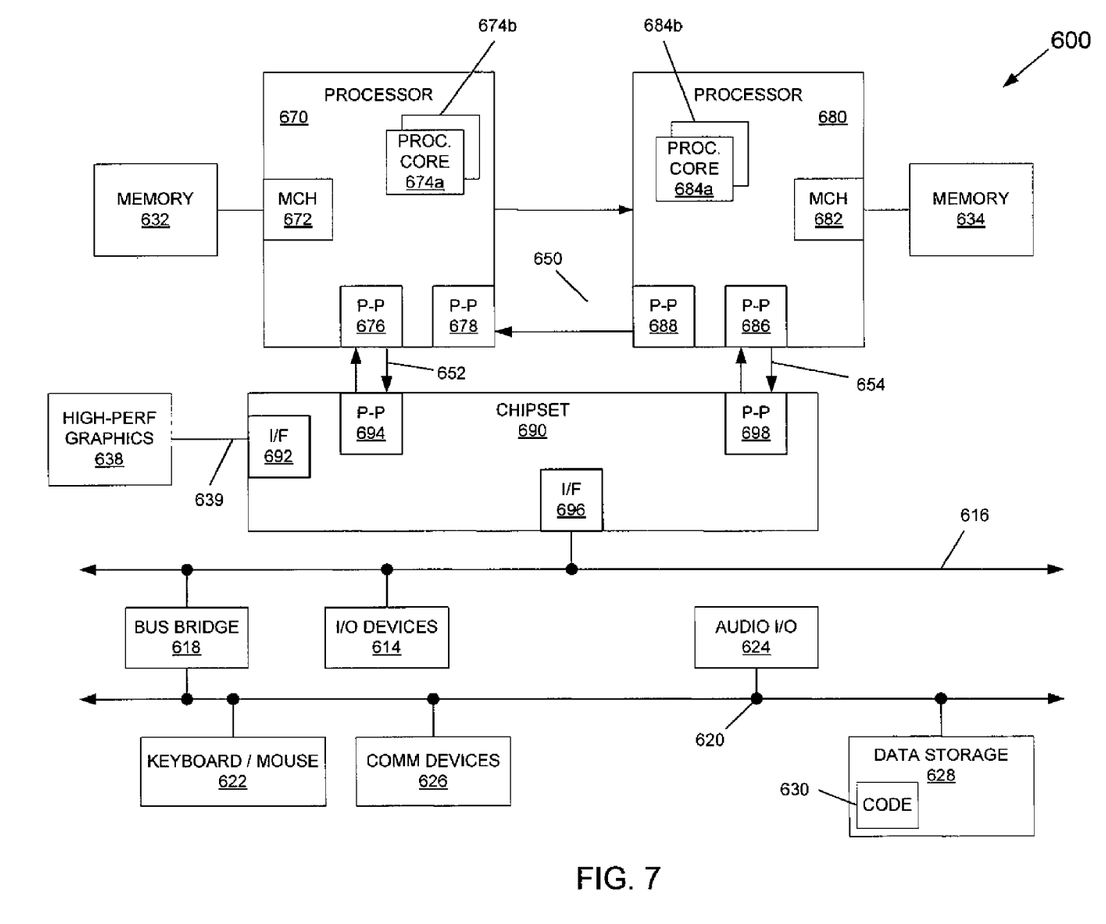
FIG. 7 is a block diagram of a system in accordance with an embodiment of the present invention.

Embodiments may be implemented in many different system types. Referring now to FIG. 7, shown is a block diagram of a system in accordance with an embodiment of the present invention. As shown in FIG. 7, multiprocessor system 600 is a point-to-point interconnect system, and includes a first processor 670 and a second processor 680 coupled via a point-to-point interconnect 650. As shown in FIG. 7, each of processors 670 and 680 may be multicore processors, including first and second processor cores (i.e., processor cores 674a and 674b and processor cores 684a and 684b), although additional cores may be present in the processors. Each processor core may include one or more Q-AVF detectors accordance with an embodiment of the present invention. In this way, various error mitigation hardware of the core can be dynamically controlled to reduce any power performance penalties when not needed.

Still referring to FIG. 7, first processor 670 further includes a memory controller hub (MCH) 672 and point-to-point (P-P) interfaces 676 and 678. Similarly, second processor 680 includes a MCH 682 and P-P interfaces 686 and 688. As shown in FIG. 2, MCH's 672 and 682 couple the processors to respective memories, namely a memory 632 and a memory 634, which may be portions of main memory (e.g., a dynamic random access memory (DRAM)) locally attached to the respective processors. First processor 670 and second processor 680 may be coupled to a chipset 690 via P-P interconnects 652 and 654, respectively. As shown in FIG. 7, chipset 690 includes P-P interfaces 694 and 698.

Furthermore, chipset 690 includes an interface 692 to couple chipset 690 with a high performance graphics engine 638, by a P-P interconnect 639. In turn, chipset 690 may be coupled to a first bus 616 via an interface 696. As shown in FIG. 7, various I/O devices 614 may be coupled to first bus 616, along with a bus bridge 618 which couples first bus 616 to a second bus 620. Various devices may be coupled to second bus 620 including, for example, a keyboard/mouse 622, communication devices 626 and a data storage unit 628 such as a disk drive or other mass storage device which may include code 630, in one embodiment. Further, an audio I/O 624 may be coupled to second bus 620.

Control of an error mitigation unit includes, but is not limited to, using control information or Q-AVF values directly, or buffering the information in order to identify trends across multiple quanta, and only acting upon the information if it indicates that the Q-AVF is beyond some threshold for a single quantum or some number of quanta. Such control can also be used to not only activate/deactivate the error mitigation hardware, but also to transition the error mitigation hardware between different tiers of activity such as a high-protection mode or a low-protection mode or modes in between as well as to choose between different protection schemes with varying power/performance costs. An example of this includes error mitigation schemes that use checkpoint generation. The frequency with which such checkpoints are generated determines the amount of progress that will be lost upon error recovery. An embodiment can be used to increase or decrease the frequency at which checkpoints are taken depending on the actual probability of serious error as given by the Q-AVF value. In such cases, the Q-AVF value may be compared across multiple thresholds in order to determine which tier of protection to activate.

In one embodiment, OS-based control may be realized by providing detector information to the OS. In such an embodiment, the OS could determine that a program is entering a vulnerable region and request a change to thresholds. For example, if the detector threshold (e.g., a first threshold) would trip at a 10% threshold, the OS could force the threshold to a different level, or cause the detector to change its quantum size.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a plurality of counters to maintain utilization values, each for a storage unit of a processor during a quantum;
a second counter to count a number of mispredictions made by a prediction unit of the processor during the quantum; and
a first logic to determine a vulnerability measure for at least a first portion of the processor for the quantum based at least in part on the utilization values and the number of mispredictions.

2. The apparatus of claim 1, further comprising a second logic to determine a vulnerability measure for a second portion of the processor for the quantum based at least in part on a second set of utilization values and the number of mispredictions.

3. The apparatus of claim 2, wherein the at least the first portion of the processor corresponds to a front end unit of the processor, and the second portion of the processor corresponds to a back end unit of the processor.

4. The apparatus of claim 1, wherein the first logic is to receive the utilization values and to determine the vulnerability measure according to a linear function having a plurality of terms each including a coefficient and one of the utilization values.

5. The apparatus of claim 4, further comprising a second logic to receive the vulnerability measure and to generate a control signal to control at least one error mitigation unit of the processor based on the vulnerability measure.

6. The apparatus of claim 5, wherein the second logic is to enable an error detection mechanism of the at least one error mitigation unit if the vulnerability measure is greater than a first threshold and is to enable an error correction mechanism of the at least one error mitigation unit if the vulnerability measure is greater than a second threshold.

7. The apparatus of claim 5, wherein the second logic is to receive a plurality of vulnerability measures each for one of a plurality of quanta and is to generate the control signal based on the plurality of vulnerability measures.

8. The apparatus of claim 5, wherein the second logic is to disable the at least one error mitigation unit if the vulnerability measure is less than the first threshold, and wherein the at least one error mitigation unit is to be configured to perform non-error mitigation tasks when disabled by the second logic.

9. The apparatus of claim 5, wherein the second logic is to dynamically control the at least one error mitigation unit to be enabled during a first portion of a program based on vulnerability measures of a first plurality of quanta and to be disabled based on vulnerability measures of a second plurality of quanta.

10. The apparatus of claim 1, wherein the apparatus comprises the processor and further comprising a detector including the plurality of counters, the second counter and the first logic, wherein the detector is associated with the first portion of the processor.

11. The apparatus of claim 10, wherein at least one of the plurality of counters of the detector is associated with a structure in a second portion of the processor.

12. A method comprising:
determining a quantized-architectural vulnerability factor (Q-AVF) value for a quantum for at least a portion of a processor using processor metric values, each corresponding to a utilization value for one of a plurality of front end structures of the processor;

comparing the Q-AVF value to at least one threshold value; and dynamically controlling at least one error mitigation unit of the processor based on the comparison.

13. The method of claim 12, further comprising determining the Q-AVF value according to a linear equation having a plurality of terms each corresponding to a processor metric value and a weight value.

14. The method of claim 12, wherein a first utilization value corresponds to a number of valid entries in a structure for each cycle of the quantum.

15. The method of claim 14, further comprising determining the first utilization value via shifting the number of valid entries by a logarithmic value corresponding to the quantum.

16. The method of claim 12, further comprising determining the Q-AVF value for a front end unit of the processor based on processor metric values for an instruction decode queue of the front end unit, a branch predictor of the front end unit, and a retirement order buffer of a back end unit of the processor.

17. A system comprising:

a multicore processor having a plurality of cores, wherein a first core includes a detector to detect a vulnerability measure for the first core based on a plurality of processor metric values each associated with operation of a core structure during a first time period, and a controller to control an error mitigation unit of the first core based on the vulnerability measure, to enable an error detection mechanism of the error mitigation unit if the vulnerability measure is greater than a first threshold, and to enable an error correction mechanism of the error mitigation unit if the vulnerability measure is greater than a second threshold; and a dynamic random access memory (DRAM) coupled to the multicore processor.

18. The system of claim 17, wherein the detector includes a plurality of counters each to maintain the processor metric values during the first time period, a second counter to count a number of mispredictions made by a prediction unit of the first core during the first time period, and a first logic to determine the vulnerability measure for at least a first portion of the first core for the first time period based at least in part on the processor metric values and the number of mispredictions.

19. The system of claim 18, wherein the detector further comprises a second logic to determine a second vulnerability measure for a second portion of the first core for the first time period based at least in part on a second set of processor metric values and the number of mispredictions.

20. The system of claim 18, wherein the first logic is to receive the processor metric values and to determine the vulnerability measure according to a linear function having a plurality of terms each including a coefficient and one of the processor metric values.

21. The system of claim 17, wherein the controller is to receive a plurality of vulnerability measures each for one of a plurality of time periods and is to generate a control signal based on the plurality of vulnerability measures.

22. The system of claim 17, wherein the error mitigation unit is to be configured to perform non-error mitigation tasks when disabled by the controller.

* * * * *